W. J. RICHARDS.
MOTOR COMPRESSOR.
APPLICATION FILED NOV. 4, 1907.

907,884.

Patented Dec. 29, 1908.

Witnesses:
Leonard W. Novander.
George C. Higham.

Inventor
Walter J. Richards
By Brown Williams
Attorneys

W. J. RICHARDS.
MOTOR COMPRESSOR.
APPLICATION FILED NOV. 4, 1907.

907,884.

Patented Dec. 29, 1908.
6 SHEETS—SHEET 4.

Witnesses
Leonard W. Novander
George E. Higham.

Inventor
Walter J. Richards
By Bennett Williams
Attorneys

UNITED STATES PATENT OFFICE.

WALTER J. RICHARDS, OF MILWAUKEE, WISCONSIN, ASSIGNOR TO NATIONAL BRAKE AND ELECTRIC COMPANY, OF MILWAUKEE, WISCONSIN, A CORPORATION OF WISCONSIN.

MOTOR-COMPRESSOR.

No. 907,884.   Specification of Letters Patent.   Patented Dec. 29, 1908.

Application filed November 4, 1907. Serial No. 400,544.

*To all whom it may concern:*

Be it known that I, WALTER J. RICHARDS, citizen of the United States, residing at Milwaukee, in the county of Milwaukee and State of Wisconsin, have invented a certain new and useful Improvement in Motor-Compressors, of which the following is a full, clear, concise, and exact description, reference being had to the accompanying drawings, forming a part of this specification.

My invention relates to motor compressors, particularly to motor compressors to be used in conjunction with air brake systems on electric railway cars, and involves several very important features of construction and arrangement.

It has been customary heretofore to suspend motor compressors in an upright position below the car, making it necessary to provide special supporting platforms or supporting cages for the motor compressor. With this manner of suspension the motor compressor is inaccessible and it is necessary to remove the motor compressor from the car in order to inspect the parts thereof or to repair them. Motor compressors of the prior art are also unnecessarily bulky and unprotected.

One of the main features of my invention is the accessibility of the motor compressor, the armature and crank shaft being adapted for removal without the necessity of removing the motor compressor from the car.

Another very important feature of my invention is the protection afforded the working parts, these parts being entirely and thoroughly inclosed and thus protected against dust, slush or other foreign matter.

The motor compressor of my invention is adapted to be suspended from a support, such as a car floor, and the motor compressor frame and all the operative parts are thoroughly insulated from the support, this being a very important feature where the motor compressor is used in connection with vehicles such as street railway cars. Means are also provided for lubricating all the operative parts from a common oil well, perfect circulation of lubricating oil being maintained from the well to the various bearing surfaces.

The entire structure is one of compactness and neatness, the motor frame and compressor frame being cast together, requiring very little machine work. The main feature, however, of thus casting the motor and compressor frames together is that permanent centers are provided for the crank shaft and motor pinion shaft, so that the driving gear and motor pinion are at all times maintained in perfect and most efficient gearing relation, and no matter how often the armature and crank shaft are disturbed or removed, upon reinstallation thereof the same efficient gearing relations are attained without the use of delicate adjustments.

The details of my invention will appear in the accompanying drawings, of which—

Fig. 7 is a sectional view of a hanger and hanger bearing, showing the insulating and cushion arrangement.

The main part of the inclosing frame comprises the crank case part 1, the motor field body part 2, and the cylinders 3, of which there may be any number, these parts being all cast together to form an integral structure. This integral structure also includes the body part 4 of the motor pinion case, which part forms an extension of the part 5 of enlarged diameter at the right end of the crank case. The part 6 is an integral casting to form a cover for the crank chamber, and has the enlargement 7 forming the continuation of the enlargement 5 on the crank chamber body. The cover 8 of the motor field frame is hinged at 9 to the body part, and the cap 10 forms the other half of the motor pinion case. The cylinder heads 11 are also separable and contain the check valve mechanisms 12 for controlling the flow of compressed air.

Extending around the lower edge of the crank chamber is the seat or flange 13, forming a seat for the flange 14 surrounding the edge of the cover part 6, the screws 15 passing through suitably spaced lugs 16 serving to hold the parts together. The engaging faces of the flanges are in a single plane and with suitable packing interposed between the parts, the likelihood of dust, dirt or moisture getting into the crank chamber is reduced to a minimum. The edge of the motor body part also forms a uniplanar seat 17 to be closely fitted by the similar edge of the cover part 8, bolts 18 passing through suitably spaced lugs 19 serving to hold the cover part to the body part, the motor parts being thus very carefully protected against dirt or other foreign substances. The cap part 10 for the pinion case has a surrounding flange 20 to fit the seat of the body part of the motor pinion case which forms part of the enlargement 7 and by means of screws 21 passing through suitable lugs 22, this cap part can be firmly secured to the body part of the pinion case. With this arrangement, when all the movable parts and the covers are secured to the integral body structure, the working parts within the structure will be entirely protected against dirt, slush, moisture or other foreign substances.

Depending from the crank chamber wall are a number of webs 23 shaped at their lower ends to form upper bearing halves 24 for receiving a crank shaft 25. The lower parts of these bearings are in the form of caps 26 having lugs 27 by means of which and bolts 28, they may be secured to the upper bearing parts 24. By removing the cover part 6 and the lower bearing sections 26, the crank shaft can readily be removed from the crank chamber. The ends of the crank chamber normally have openings 29' and 29 for allowing clearance space for tools when the crank shaft bearings are finished. These openings after finishing of the bearings are closed by lids 30 and 31, respectively. Secured to the right end of the crank shaft and disposed within the enlarged parts 5 and 7 is the gear 32. The cranks 33 of the crank shaft are shown as connected with the pistons 34 by connecting rods 35, these cranks being angularly displaced so that upon turning of the crank shaft the pistons will be reciprocated within the cylinders in proper sequence.

The motor field frame body part 2 is shown as supporting the poles 36 and 37. These poles support and secure to the field frame field coils 38. The other companion field poles 39 and 40 are shown as carried by the cover part 8 and also support field windings. These poles may be cast integral with the field frame parts or may be separable. At the ends of the motor field frame are webs or walls 41 and 42, having the axial openings 43 for receiving frames 44, forming combined bearings, housings and oil wells. The frame at the left supports the bearing 45, while the frame at the right supports the bearing 46 in which bearings is journaled the armature shaft 47, carrying the armature 48, the commutator 49 and at its right end the pinion 50 disposed within the pinion case and meshing with the gear 32 supported to the crank shaft. The frames 44 with the armature shaft bearing parts and rings 51 form well-known ring oil bearing structures, the rings dipping into oil contained in the frames 44 and carrying this oil to the armature shaft bearing parts. Guard or shield frames 52 are shown carried by the armature shaft, these frames extending into the frames 44 to prevent splashing or creeping of oil toward the commutator and the armature windings. Upon rotation of the armature and the pinion carried by the armature shaft, the gear 32 and crank shaft will be rotated and the pistons reciprocated within the cylinders. Supporting brackets 53, which may be cast integral with the motor frame body part, serve to carry suitable brush gearing 54 for holding brushes 55 against the commutator.

Where gear and pinion are used connecting the armature and the crank shaft, it is absolutely imperative that the distance between centers of the crank shaft and armature shaft be exact, otherwise the teeth of the gear and pinion will not roll on one another with the mechanical accuracy that is necessary in order to obtain the least amount of friction and noise, and this exact distance must be constant in order that the efficiency of operation be maintained. When the motor is built separate from the compressor, as in prior devices, so that there are finished surfaces between the motor and the compressor, it is almost impossible to obtain the desired degree of accuracy in the distance between the shaft centers. Liners are usually employed, but the required thickness of these liners can be determined only by trial, and is left to the judgment of whoever may be assembling the motor compressor. After the motor compressors leave the factory and after use are dismantled for any reason, and one of the liners should become lost or torn, it is more than likely that upon reassembly, the adjustment will be very much disturbed and the efficiency of operation of the motor compressor very much reduced. In accordance with my invention, however, the entire body structure is of a single casting and the shaft centers can be determined with absolute precision to give the most efficient gearing relation, and the adjustment will always be maintained, no matter how often the crank shaft and armature are removed or how often the gear and pinion are disengaged. By providing special tools, the motor yoke can be bored out, the crank shaft bearings bored out and the two cylinders bored out, all simultaneously, thus reducing the expense of manufacture to a minimum.

In my arrangement of the frame parts, I place the crank chamber in the center, the motor at one side and the cylinders at the other, the plane passing through the crank shaft and motor centers slanting upwardly in one direction from the horizontal, and the plane passing through the centers of the crank shaft and cylinders slanting upwardly from the horizontal in the other direction. With this arrangement, the backward thrust of the pistons through the gear is not directly against the armature shaft. If the armature shaft is in the direct line of backward thrust of the pistons, the crank shaft may spring due to the varying air pressure against the piston during each stroke and the distance beween centers of the crank shaft and armature shaft may thus vary, thereby to cause a varying degree of meshing of the pinion and gear teeth. The ideal situation for the armature shaft is to have it at right angles to this line of thrust, but for purposes of obtaining greater compactness and also for the purpose of a novel method of suspending my motor compressor from the car, I have resorted to the compromise location of the motor and cylinder parts as just described.

Figure 1:
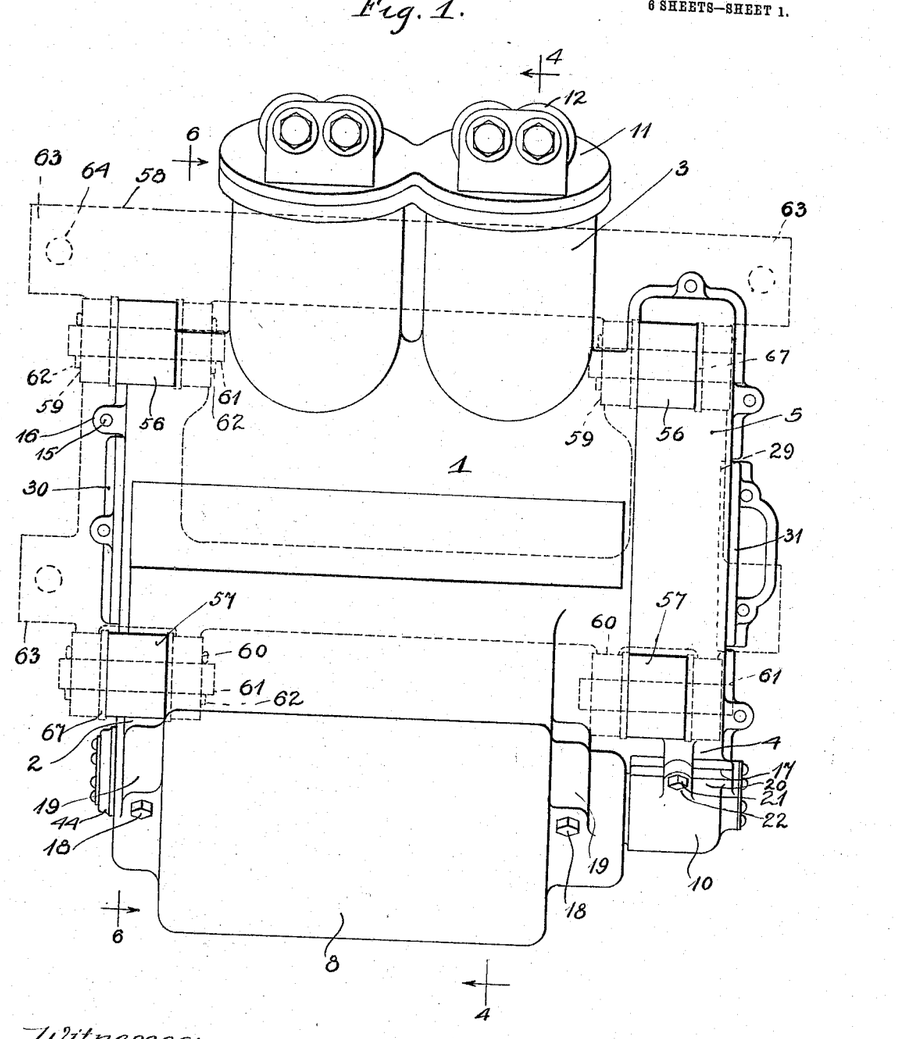
Figure 1 is a top view.
Figure 2:
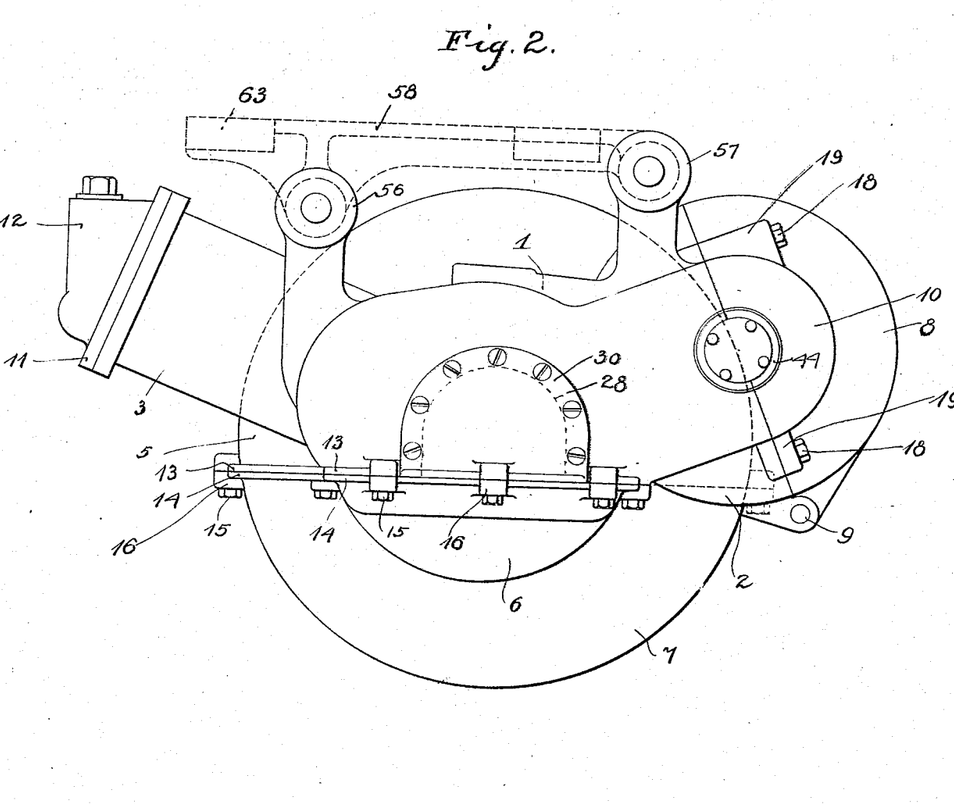
Fig. 2 is a side view from the left.

I shall now describe the method of suspending the motor compressor. As best shown in Fig. 1, four hanger lugs are cast integral with the body structure and placed in the most suitable position, the hangers 56 appearing at the opposite corners of the cylinder end and the hangers 57 appearing at opposite corners of the motor end, and in a line parallel with the line through the hangers 56. A frame 58, shown in dotted lines in Figs. 1 and 2, has two sets of bearing lugs 59 for receiving the hangers 56 and two sets of bearing lugs 60 for receiving the hangers 57. Each hanger is pivoted between its bearing lugs by a pin 61 which after application may be secured in place by cotter pins 62, as shown. The frame 58 has suitable extensions 63 with bolt holes 64 whereby it may be secured beneath the floor of a car or other support.

To thoroughly insulate the frame from its support, I introduce insulating bushings 65 and washers 66 as shown in Fig. 7. The bushings are preferably of soft rubber to give a cushioning effect and to protect the frame against jars and jolts, and also to prevent the transmission of vibration and noise to the support. To strengthen the rubber, a metallic lining 67 may be provided for.

The angles at which the motor and cylinder frame parts extend from the crank chamber part are such that the motor and cylinder frame parts will be just below the plane of the supporting frame 58, forming thus the most compact arrangement, while at the same time bringing the motor and cylinder parts as far away as possible from the ground. With this arrangement also the motor compressor and its parts can be readily inspected in place. The armature and commutator are perhaps the parts which need to be most often inspected or removed from the compressor. By removing bolts 18 and 21, the hinged section 8 of the motor frame can be swung downwardly, whereupon the armature and commutator are open to inspection but are still held in place by the pinion case cap 10. This cap can easily be removed, and the armature can then be lifted out of the bearings. The angle of the motor frame is sufficient to prevent the armature shaft from rolling out of the bearings upon removal of the parts 8 and 10. To remove the pistons, the pins 61 over the cylinders are withdrawn and the frame swung downwardly. The cylinder heads can then readily be removed and the pistons withdrawn. As already stated, the crank shaft can be dropped by removing the cover 6, after first disconnecting the connecting rods and removing the lower bearing heads 26. Inspection and repairs can then be readily and quickly accomplished without entirely removing the frame from the support.

Figure 3:
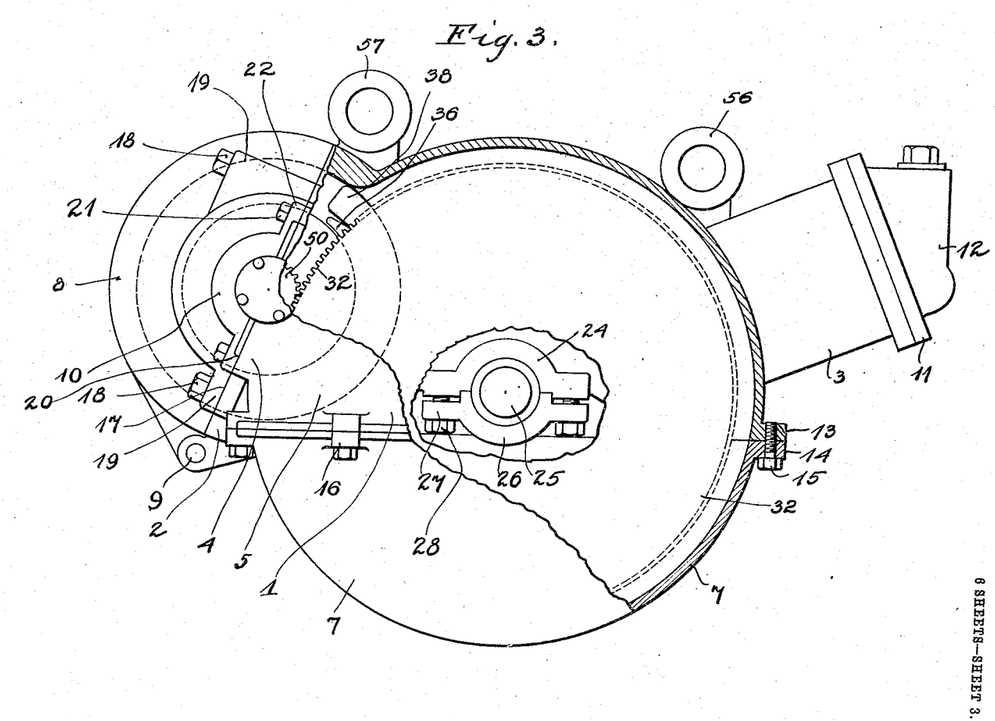
Fig. 3 is a side view from the right, with several of the parts broken away to more clearly show the construction and arrangement.
Figures 4, 5:
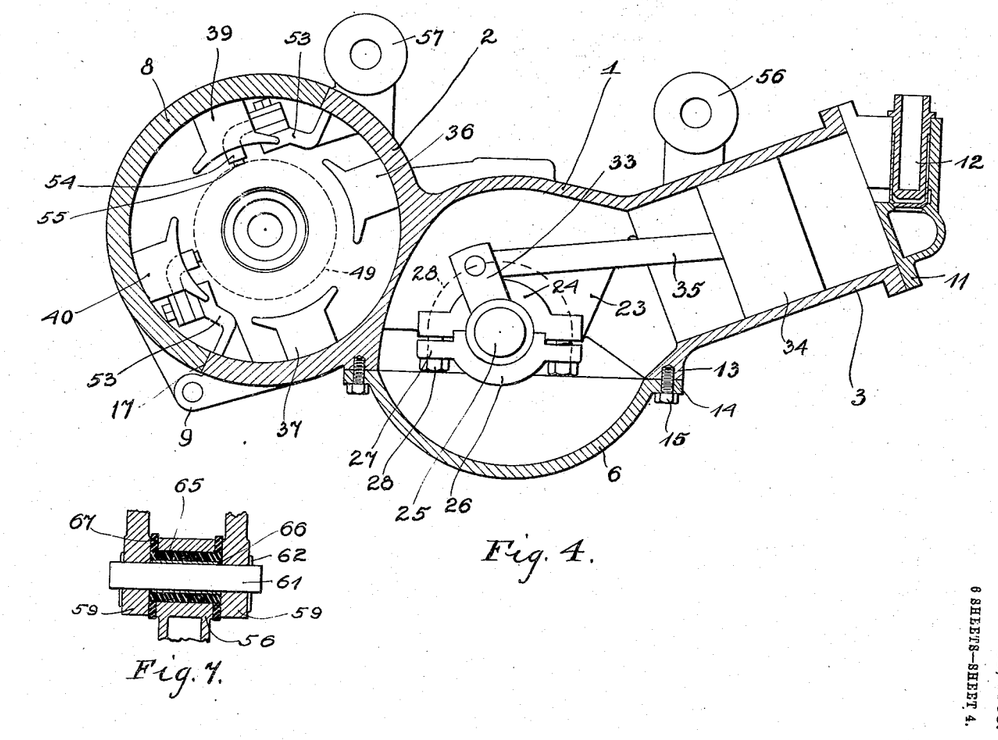
Fig. 4 is a sectional view taken on line 4—4 of Fig. 1.
Fig. 5 is a sectional view with the motor frame cap removed and showing the interior arrangement of the motor.
Figure 5:
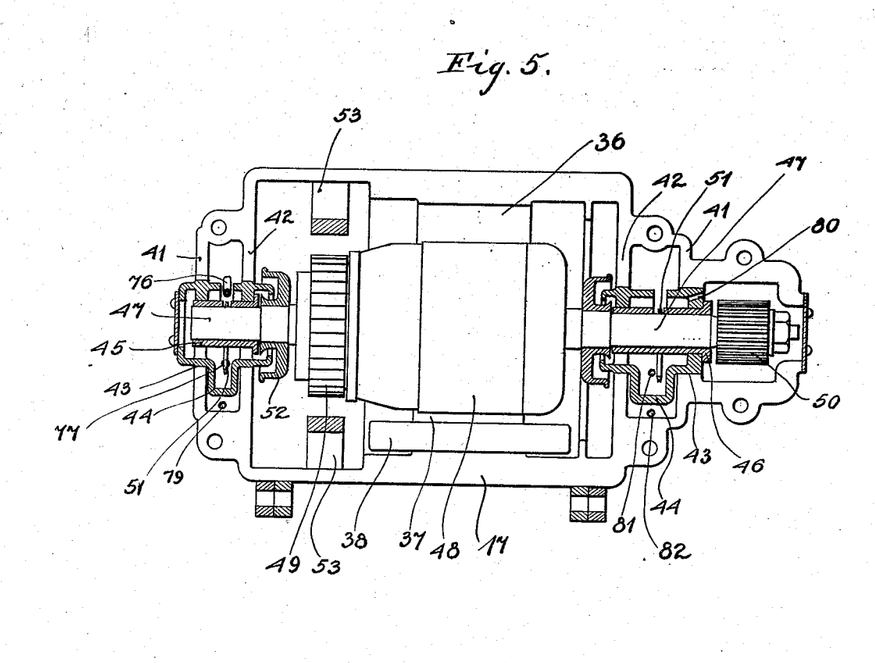
Figure 6:
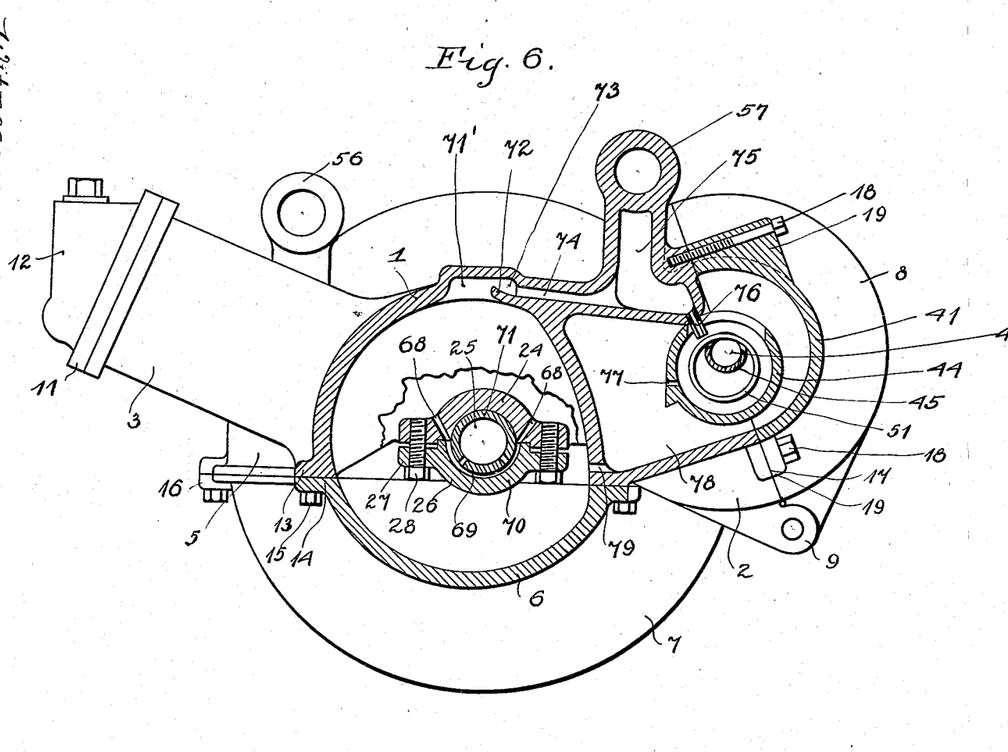
Fig. 6 is a sectional view taken on line 6—6 of Fig. 1.

In Figs. 3, 5 and 6 is clearly shown the improved method for oiling the various operative parts. The cover part 6 forms an oil pan for receiving lubricating oil and as the crank shaft rotates, the cranks and connecting rods splash the oil about the crank chamber and into the cylinders, thus lubricating the cylinders and pistons. As the cylinders are slanting, as described, the oil will readily flow back to the crank chamber. The upper crank chamber bearing halves 24 have oil channels 68 which lead into oil grooves 69 cut in the lower bearing halves 26 through which groove passage-ways 70 leading from the bushing 71 carry to the crank shaft any oil which is splashed into the entrance ways 68. The top wall of the crank chamber above the crank shaft is also ridged to form the chamber 71' and extending into this chamber 71' from the motor side is a ledge or shelf 72 which slants upwardly, slightly, as shown, and which forms with the chamber walls an oil pocket 73 for receiving oil splashed up by parts rotating within the crank chamber. At the commutator end of the crank chamber a channel 74 leads from the oil pocket 73 into a chamber 75 formed within the hanger lug at the commutator end, and from said chamber a pipe or spout 76 leads into the frame 44 at the commutator end of the motor, thus supplying oil to the bearing ring 51. An overflow opening 77 through the walls of the frame 44 carries the oil into the chamber 78 between the walls 41 and 42, from which the oil is returned through opening 79 to the crank chamber and oil pan 6. The gear 32 dipping into the oil pan carries oil to the armature pinion 50 and into the pinion frame, from which frame the oil is led through passage-way 80 into the housing 44 of the pinion and armature bearing. The oil passes from this ring bearing through the overflow outlet 81 into the chamber between the walls 41 and 42, and from thence through channel 82 back to the crank chamber and oil pan. Thus, a continual circulation of oil is maintanied from the oil pan to the various bearing surfaces and oil wells and back to the oil pan, it being necessary to fill in oil only at one point.

I thus provide a motor compressor which is very simple and very compact, and whose operation as a result of the various constructions and arrangements is very efficient.

I desire to secure the following claims by Letters Patent:

1. In a motor compressor, the combination of a crank case, a motor frame and compression compartment frames, and a removable cover on the under side of the crank case forming an oil reservoir.

2. In a motor compressor, the combination with a crank body, a motor frame body, and cylinders all cast to form an integral structure, of the cover for the motor frame body, and a removable cover on the under side of the crank case forming an oil well.

3. In a motor compressor, the combination of a crank chamber, a motor frame at one side of the crank chamber and parallel therewith, cylinders extending laterally from the other side of the crank chamber, said crank chamber having an outlet opening downwardly through which contained parts may be dropped.

4. In a device of the class described, the combination of an inclosing frame for containing compression apparatus, an inclosing frame section for a motor cast integral with the compression mechanism inclosing frame, a removable section for the motor frame, and a removable cover on the under side of the compression apparatus inclosing frame acting as an oil reservoir.

5. In a device of the class described, the combination of a crank chamber, cylinders extending upwardly at an angle from one side of the crank chamber, a motor frame extending upwardly at an angle from the other side of the crank chamber, said crank chamber cylinders and motor frame being an integral casting.

6. In a motor compressor, the combination with the compressor frame of one-half of the motor frame cast integral therewith and extending upwardly at an angle therewith, the other half of the motor frame being removable, the dividing plane between the motor sections being perpendicular to a plane passing through the centers of the compressor frame and the motor frame.

7. In a device of the class described, the combination of a crank chamber frame, a crank shaft journaled within the crank chamber, cylinders extending from the crank chamber frame, pistons within said cylinders having connection with the crank shaft, a motor frame body part cast integral with the crank chamber frame, said motor frame body part extending upwardly at an angle from one side of the crank chamber frame, the other part of the motor frame being removable, motor parts within the motor frame including an armature mounted on a shaft parallel with the crank shaft, the dividing plane between the motor sections being perpendicular to a plane passing through the centers of the crank shaft and armature shaft whereby when the removable motor frame section is removed the armature may readily be taken from the motor frame.

8. In a motor compressor, the combination of a cylindrical crank frame body part, cylinders extending from one side of the crank frame and inclined slightly upwardly, a motor frame extending from the other side of the crank frame and inclined slightly upwardly, said crank frame body, said cylinders and the body part of the motor frame being an integral casting, the other part of the motor frame being removable to allow access to the motor parts within the motor frame, a removable cover for the under side of the crank case forming an oil receptacle, and hanger lugs extending upwardly from the integral casting for suspending the device from a suitable support.

9. In a motor compressor, the combination of a cylindrical crank frame, cylinders extending upwardly at an angle from one side of the crank frame, a cylindrical motor frame parallel to the crank frame and extending upwardly at a slight angle from the other side of the crank chamber frame, one-half of the motor frame being cast integral with the crank chamber frame and the other half of the motor frame being removable, bearings at the ends of the motor frame, an armature shaft journaled in said bearings and supporting the armature, field producing means carried by the motor frame parts, a crank shaft within the crank chamber frame, pistons within the cylinders connected with the crank shaft, a gear within the crank chamber secured to one end of the crank shaft, a pinion at one end of the armature shaft engaged by said gear, and hanger lugs extending from the frame work for suspending the structure from a support, the dividing plane between the motor parts being perpendicular to a plane passing through the crank shaft and armature shaft whereby upon removal of the removable motor frame part the armature can readily be removed from the motor frame.

10. In a motor compressor, the combination of a cylindrical crank chamber frame, cylinders extending from the crank chamber frame, a crank shaft journaled within the crank chamber, pistons within the cylinders having connection with the crank shaft, a cylindrical motor frame parallel with the crank chamber frame and extending from one side thereof, bearings at the ends of the motor frame, an armature shaft journaled in said bearings and supporting the armature, and gearing connected between the crank shaft and the armature shaft, said motor frame and bearings being split along a plane slightly at an angle with the vertical so that when the upper part of the motor frame is removed said armature can easily be removed from the bearing halves supported by the stationary motor frame part, the stationary motor frame part being cast integral with the crank chamber frame.

11. In a device of the class described, the combination of a crank chamber frame, cylinders extending from said crank chamber frame, a motor frame extending from said crank chamber frame, motor parts within the motor frame, pistons within the cylinders, a crank shaft within the crank chamber frame having connection with the motor parts and pistons, inverted bearings within the crank chamber, removable caps for said bearings, a removable cover on the under side of the crank chamber frame, removal of said cover and the inverted bearing caps and disconnection of the pistons from the crank shaft allowing removal of the crank shaft from the crank chamber, and suspension lugs extending upwardly from the frame structure by means of which said device may be suspended from a horizontal support.

12. In a motor compressor, the combination of the inclosing frame work, suspension lugs extending upwardly from the frame work for suspending said frame-work from a horizontal support, a crank shaft within the frame, inverted bearings in which said crank shaft is journaled having removable caps, and a removable cover for normally covering an opening below the crank shaft, the removal of said cover and the inverted bearing caps allowing the crank shaft to be dropped from the frame.

13. In a motor compressor, the combination of a cylindrical crank chamber frame, cylinders extending from one side of the crank chamber frame, a cylindrical motor frame extending from the other side of the crank chamber frame and parallel therewith, bearings at the ends of the motor frame, said motor frame being split longitudinally along a nearly vertical plane, the outer section of the motor frame being removable, an armature shaft journaled within the bearings, an armature pinion secured to one end of the armature shaft, a divided pinion case, a crank shaft within the crank chamber, a gear secured to one end of the crank shaft, the crank chamber frame, the stationary part of the motor frame and one part of the armature pinion casing being cast integral.

14. In a motor compressor, the combination of a cylindrical crank chamber frame, cylinders extending from one side of the crank chamber frame, a crank shaft journaled within the crank chamber, pistons in the cylinders having connection with the crank shaft, a cylindrical motor frame extending from the other side of the crank chamber frame, bearings at the ends of the motor frame, one-half of the motor frame and bearings being cast integral with the crank chamber frame, the other half of the bearings and motor frame being cast integral and being removable, an armature shaft journaled within said bearings and supporting an armature, a pinion secured to one end of the armature shaft, a pinion case having one-half cast integral with the stationary motor frame part and the crank chamber frame, the other half of the pinion case being removable, a gear mounted on one end of the crank shaft and meshing with the armature pinion, the plane of division between the motor frame parts being slightly inclined from the vertical, whereby the armature will be maintained in the stationary bearing sections upon removal of the removable motor frame parts and pinion case half and whereby said armature may be readily removed from the motor frame.

15. In a motor compressor, the combination of a crank chamber frame, cylinders, a crank shaft journaled within the crank chamber frame, pistons in the cylinders having connection with the crank shaft, a motor frame, bearings at the ends of the motor frame, an armature within the motor frame mounted on a shaft journaled in said bearings, a gear within the crank chamber secured to one end of the crank shaft, a pinion secured to one end of the armature shaft and engaging with the gear, a removable cover below the crank chamber forming an oil reservoir, and means for causing circulation of lubricating oil from said reservoir to the armature bearings.

16. In a motor compressor, the combination of a crank chamber frame, cylinders, a crank shaft journaled within the crank chamber frame, pistons in the cylinders having connection with the crank shaft, a motor frame, bearings at the ends of the motor frame, an armature within the motor frame mounted on a shaft journaled in said bearings, a gear within the crank chamber secured to one end of the crank shaft, a pinion secured to one end of the armature shaft and engaging with the gear, a removable cover below the crank chamber forming an oil reservoir, and means independent of the gear and pinion for individually causing circulation of oil to the armature bearings.

17. In a motor compressor, the combination of a crank chamber inclosing frame, cylinders extending from said crank chamber frame, crank mechanism within the crank chamber, pistons within the cylinders, connected with the crank mechanism, a motor frame at one side of the crank chamber frame, armature bearings on said motor frame, an armature shaft journaled in said bearings and supporting an armature, the lower part of the crank chamber containing oil into which the crank mechanism parts dip, an oil trough extending along the upper part of the crank chamber for receiving the oil splashed upwardly by the crank mechanism parts, a channel leading from said oil trough to an armature bearing, and a return channel from said armature bearing to the crank chamber.

18. In a device of the class described, the combination of the motor compressor inclosing frame, hanger lugs cast integral with said frame and extending upwardly therefrom, a supporting frame having bearing lugs to which said hanger lugs may be pivoted whereby said supporting frame will carry the weight of the suspended motor compressor, and soft, elastic insulating material inserted between the hanger lugs and the bearing lugs whereby the motor compressor is insulated from the supporting frame and whereby the motor compressor is protected against jars and jolts and whereby the noises of operation are prevented from reaching the support to which the supported frame is secured.

19. In combination, a metallic supporting frame secured to the under side of a car floor, bearing lugs extending downwardly from said supporting frame, a motor compressor, hanger lugs extending upwardly from the motor compressor inclosing frame for engagement with the bearing lugs, and yielding elastic material interposed between the hangers and bearing lugs to act as a non-transmitter of noise and vibration from the motor compressor to the car body and to protect the motor compressor against jars or jolts incident to the running of the car body.

20. In combination, a vehicle, a metallic supporting frame secured below the floor of the vehicle, bearing lugs extending from the supporting frame, a motor compressor, hanger lugs extending from the motor compressor frame and having pivotal connection with the bearing lugs, and bushings of cushioning insulating material interposed between the hanger lugs and bearing lugs whereby to insulate the motor compressor from the vehicle and to protect the motor compressor from the jars and jolts of the vehicle and to prevent the transmission of noise and vibration from the motor compressor to the vehicle.

21. In combination, a horizontal supporting frame, bearing lugs extending downwardly from said frame, a motor compressor, a crank chamber frame for the motor compressor, cylinders for the motor compressor extending upwardly at an angle from one side of the crank chamber frame, a motor frame extending upwardly at an angle from the other side of the crank chamber frame, and hanger lugs extending upwardly from the motor compressor frame-work for engaging the bearing lugs of the supporting frame.

22. In combination, a horizontal supporting frame, bearing lugs extending downwardly from said frame, a motor compressor, a crank chamber frame for the motor compressor, cylinders for the motor compressor extending upwardly at an angle from one side of the crank chamber frame, a motor frame extending upwardly at an angle from the other side of the crank chamber frame, and hanger lugs extending upwardly from the motor compressor frame-work for engaging the bearing lugs of the supporting frame, said motor being split longitudinally along a nearly vertical plane so that one section thereof may be removed to allow removal of motor parts without disconnecting the motor compressor from the supporting frames.

23. In a motor compressor structure, the combination of a cylindrical crank case enlarged at one end to form a gear compartment, a lower outlet from the crank case and gear compartment, a removable cover for said outlet, a motor frame extending from the crank case, cylinders extending from the gear case, and supporting hangers above the crank case for suspending the structure from a support.

24. In a motor compressor, the combination of a cylindrical crank case having an enlargement at one end to form a gear compartment, a motor frame part, bearing parts, a pinion case part, said crank case and gear compartment being cast integral with the motor frame and with the bearing parts and pinion case part, a cover for the motor frame, bearing parts cast integral with the motor cover part to engage with the before-mentioned bearing parts when the cover is applied, and a removable pinion case part for engaging the before-mentioned pinion case part.

25. In a motor compressor, the combination of a containing case for containing compression mechanism, a motor frame part cast integral with said casing, field poles supported from said motor frame part, a removable frame part, and field poles supported by said removable part.

26. In a motor compressor, the combination of a containing case containing compression parts, a motor field frame part cast integral with the casing and supporting field poles, a removable motor field frame supporting other field poles, bearing sections cast integral with the removable motor frame part, and bearing sections cast integral with the removable motor frame part.

27. In a motor compressor, the combination of a casing, compression mechanism within said casing, a motor frame part cast integral with the casing, field poles supported from said motor frame part, a removable motor frame part, field poles supported from said removable part, said removable part when in engagement with the stationary motor part forming therewith a complete motor field frame, bearing sections cast integral with the stationary motor frame part, bearing sections cast integral with the removable frame part, said bearing sections when brought together forming complete bearings, an armature shaft journaled within said bearings, means for connecting said armature shaft with the compression mechanism, and brush holder supporting frames cast integral with the stationary motor frame part.

28. In a motor compressor, the combination of cylinders, a motor frame, a crank case intermediate said cylinders and motor frame and forming an integral structure therewith, and supporting hangers extending from the structure whereby said structure may be suspended from a horizontal support.

29. In a motor compressor, the combination of a crank case, cylinders, a motor frame, said crank case, cylinders and motor frame being cast integral and arranged in horizontal sequence, and hanger lugs cast integral with the structure and extending upwardly whereby said structure may be hung from a horizontal support.

30. In a device of the class described, the combination of the motor compressor inclosing frame, hanger lugs cast integral with said frame and extending upwardly therefrom, a supporting frame having bearing lugs to which said hanger lugs may be pivoted whereby said supporting frame will carry the weight of the suspended motor compressor, and insulating material inserted between the hanger lugs and the bearing lugs whereby the motor compressor is insulated from the supporting frame.

31. In combination, a metallic supporting frame secured to the under side of a car floor, bearing lugs extending downwardly from said supporting frame, a motor compressor, hanger lugs extending upwardly from the motor compressor inclosing frame for engagement with the bearing lugs, and insulating material interposed between the hangers and bearing lugs.

32. In a motor compressor, the combination with the compressor frame of one-half of the motor frame cast integral therewith and extending upwardly at an angle therewith, compressor mechanism within the compressor frame, an armature within the motor frame, a gear connected with the compressor mechanism, a pinion on the armature shaft and connected with said gear, a removable frame forming the other half of the motor frame, a pinion case part for the pinion forming part of the compressor frame and motor frame part cast integral therewith, and a removable cover for said pinion case, said cover serving to hold the armature within the motor frame upon disconnection of the removable member.

33. In a motor compressor, the combination of a compressor frame, compressor parts within said frame, a gear connected with said compressor parts, a motor frame formed of a stationary and a removable half, the stationary half being cast integral with the compressor frame, bearing frame halves adjacent the stationary motor frame half, an armature having its shaft engaging in said bearing halves, a pinion on said armature shaft engaging said gear, removable bearing frame halves for the stationary bearing frame halves, a pinion case half cast integral with the compressor frame and stationary motor frame part, a removable half for the stationary pinion case half, the dividing plane between the motor frame parts, bearing frame parts and pinion case parts being common and slightly inclined from a vertical plane, whereby the armature will remain in the stationary bearing halves when the removable bearing halves and the removable motor frame parts are disconnected, said removable pinion case half serving to hold the armature in the stationary bearing halves to prevent accidental escape of the armature shaft from said bearing halves upon disconnection of the removable bearing halves.

In witness whereof, I hereunto subscribe my name this 1st day of November A. D., 1907.

WALTER J. RICHARDS.

Witnesses:
NELLIE QUIGLEY,
R. A. WEGNER.